Patented Dec. 16, 1924.

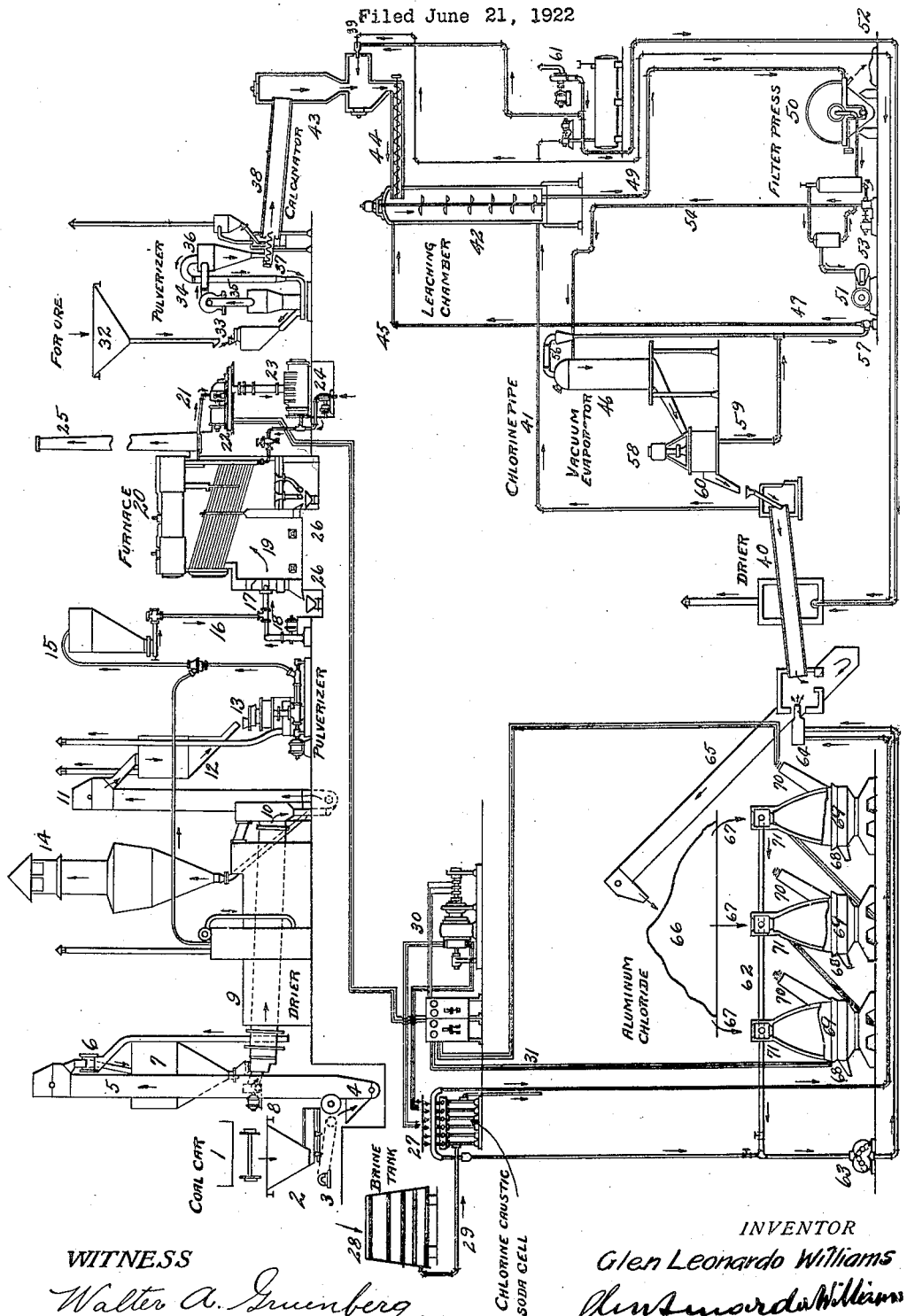

1,519,648

UNITED STATES PATENT OFFICE.

GLEN LENARDO WILLIAMS, OF DETROIT, MICHIGAN, ASSIGNOR TO DETROIT AERO METALS COMPANY, OF DETROIT, MICHIGAN, A CORPORATION OF DELAWARE.

PROCESS OF OBTAINING ALUMINUM FROM ITS ORES.

Application filed June 21, 1922. Serial No. 569,949.

*To all whom it may concern:*

Be it known that I, GLEN LENARDO WILLIAMS, a citizen of the United States of America, residing in the city of Detroit, in the county of Wayne, in the State of Michigan, have invented certain new and useful Improvements in a Process of Obtaining Aluminum from its Ores, of which the following is a specification.

This invention has for its object to obtain metallic aluminum from clays or minerals of any kind containing either the silicates or oxides of aluminum. In the process, the aluminum silicates or oxides are treated with gaseous chlorine until they are converted into aluminum chlorides, and these chlorides are then electrolyzed to form metallic aluminum and chlorine gas, the gas being returned for the treatment of new material as a continuous operation in a cyclic system.

While the apparatus used may obviously be varied in details of construction, the accompanying drawing illustrates diagrammatically a practical cycle of elements suited for carrying out the process.

Coal from a car 1 entering the hopper 2 of a crusher 3 is delivered after being crushed to the lower end of the lift 5 which hoists it to the hopper 6 of a drier 7 connected with a drier 9 heated by gas or oil and provided with a fan 8.

The dried coal drops into the elevator 10 which lifts it to the upper end 11 where it is delivered to the hopper 12 of the pulverizer 13. Moisture and heated gases escape through the ventilator 14, and the pulverized coal is lifted by a pump to the hopper 15 and thence comes down through the pipe 16 to the burner 17. Air from the fan 18 blows the coal into the combustion chamber 19 of the water tube boiler 20 which generates steam for the turbine 21 used to drive the electric generator 22. Steam from the turbine is condensed in the vacuum condenser 23 and the hot water of condensation is then forced back by the pump 24 into the boiler 20. The products of combustion are removed by the stack 25 and the cars 26.

Chlorine gas is obtained by the electrolysis of a brine or solution of salt in a battery of cells 27, the brine being conveyed from the tank 28 by the pipe 29. The electric energy required to convert the salt into caustic soda and chlorine is a low voltage current supplied by the rotary generator 30 which also supplies current through circuit 31 for the electric furnaces later described.

As a source of aluminum, one may start with clay, kaolin, bauxite, or other aluminous materials such as hydrargillite, diaspore, and others containing aluminum oxides. The material is placed in a hopper 32 leading to the crusher 33 communicating with a cyclone pulverizer 34 having a fan 35. The pulverized material is carried to a hopper 36 from which a screw 37 forces it into a calcinator 38 heated by an oil burner 39 which is also supplied with chlorine gas coming from a drier 40 through a pipe 41 leading into the leaching chamber 42 which communicates with the calcinator 38 through its combustion chamber 43.

The chlorine, mixed with the heated carbonaceous gases from the burning oil comes into contact with the calcined material falling into the combustion chamber. Carbon from the gases from the oil unites with the oxygen in the material and chlorine unites with the aluminum in the material to form aluminum chloride. The material passing through the combustion chamber 43 is carried by the screw conveyor 44 into the leaching tank 42 supplied with water by the pipe 45 or with mother liquor from the centrifugal machine 58 forced by the pump 57 into the tank 42. The liquid in the tank 42 is saturated with chlorine entering through pipe 41 and the aluminous materials brought in by the conveyor 44 react with the chlorine to form aluminum chloride if they have not already united with the chlorine in the combustion chamber. Silica is left as an insoluble residue. The material from the tank 42 is withdrawn by pipe 49 to a filter press 50, the dissolved aluminum chloride being sucked out by the pump 51, leaving the silicate residue as indicated at 52.

The clear solution from the filter press is forced by pump 53 through pipe 54 into the vacuum evaporator 46, preferably heated by steam. This mother liquor loses its water which is condensed in condensers 56 and then driven by the pump 57 through pipe 47 into the tank 42 thus completing a water cycle. Additional water containing dissolved chloride is obtained when the crystals drawn from the evaporator 46 are placed in the centrifugal machine 58 which throws out the liquid remaining upon the moist crystals, this mother liquor passing through the pipe 59 and being forced by the pump 57 into the tank 42.

The crystals from the centrifugal machine 58 pass through conveyor 60 into the drier 40, oil and air for this drier being supplied by the pumps 61 which also furnish oil and air for the burner 39 of the combustion chamber 43.

Chlorine gas from the cells 27 and also chlorine gas from the electric furnaces 62 are driven by the pump 63 into the burner at 64 which converts any remaining aluminum oxide or other salts in the drier 40 into aluminum chloride. The sublimized chloride is carried by the elevator 65 to a storage place 66 whence it is taken to the electric furnaces 62 as indicated by arrows 67.

Direct electric current from the generator 30 is supplied through circuit 31 to the series of electric furnaces 62 where the aluminum chloride is electrolyzed. The metal sinks to the bottom of the furnaces and is withdrawn at outlets 68. The chlorine is withdrawn by a pipe having a pump 63 which forces the chlorine into the burner 64. Only chlorine gas and a very few traces of aluminum chloride enter through the vacuum fan or pump 63 into the final drier 40 and these are absorbed by the moist crystals so that no loss occurs. Thus it will be seen that the chlorine is used over and over again in a cyclic system and when new chlorine is needed to replace losses, the electrolysis of salt brine in the cells 27 furnishes the amount needed.

The furnaces operate under a reduced pressure due to the action of the pump 63. They have a carbon lining 69 as an anode and a tantalum cathode 70. Equivalent cathode materials are iron tantalum alloy, tungsten, tantalum, molybdenum alloy, or any alloy which is not affected by chlorine or chlorides, or even any material which strongly resists chlorine, and it will be understood that the invention is not limited to the use of a specific material.

I claim:

1. The process of producing aluminum from its ores which consists in heating the ore in the presence of chlorine to produce aluminum chloride and then electrolyzing the aluminum chloride to produce metallic aluminum and chlorine gas.

2. The process of obtaining aluminum from its ores which consists in heating the ores in the presence of chlorine to cause the chlorine to combine with a portion of the ores to form aluminum chloride, then electrolyzing the aluminum chloride to dissociate the compound into metallic aluminum and chlorine, and then using the chlorine obtained in the dissociation to treat new ores in a cyclic system.

3. The process of obtaining aluminum from its ores which consists in heating the pulverized ores in the presence of carbonaceous gases and chlorine whereby the oxygen in the ores unites with carbon in the gases and the aluminum in the ores unites with the chlorine to form aluminum chloride, and then electrolyzing the aluminum chloride to produce metallic aluminum and chlorine gas.

4. A process as defined in claim 3, having as a further step using the chlorine obtained from the electrolysis for treatment of additional ores in a cyclic system.

5. The process of obtaining aluminum from its ores which consists in calcining the pulverized ores in the presence of carbonaceous gases and chlorine, then subjecting the calcined material to the action of a saturated solution of chlorine in water, then recovering the aluminum chloride formed by the action of the chlorine and electrolyzing this chloride to produce metallic aluminum and chlorine.

6. The process of producing aluminum from its ores which consists in heating its ores in the presence of chlorine and carbonaceous gases to form aluminum chloride and then electrolyzing the aluminum chloride in a direct current electric furnace having a carbon anode and a cathode of an alloy of tantalum resistance to chlorine to produce metallic aluminum and chlorine.

7. The process of obtaining aluminum from its ores which consists in subjecting the pulverized ores to heat in the presence of chlorine and then electrolyzing the aluminum chloride obtained from the chlorinized ores in a direct current electric furnace under reduced pressure, the furnace having a carbon lining acting as an anode and permitting the escape of chlorine and the cathode consisting of a metallic material resistant to chlorine.

In testimony whereof, I affix my signature.

Signed on the 8th day of June, 1922, in the city of Detroit, in the county of Wayne, in the State of Michigan.

GLEN LENARDO WILLIAMS. [L. S.]